(12) United States Patent
Karanian et al.

(10) Patent No.: US 11,959,422 B2
(45) Date of Patent: Apr. 16, 2024

(54) COMBUSTOR TO VANE SEALING ASSEMBLY AND METHOD OF FORMING SAME

(71) Applicant: Raytheon Technologies Corporation, Farmington, CT (US)

(72) Inventors: Caroline Karanian, West Hartford, CT (US); Steven D. Porter, Wethersfield, CT (US); John T. Ols, Northborough, MA (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/130,270

(22) Filed: Apr. 3, 2023

(65) Prior Publication Data

US 2024/0003301 A1    Jan. 4, 2024

Related U.S. Application Data

(62) Division of application No. 17/175,087, filed on Feb. 12, 2021, now Pat. No. 11,619,174.

(60) Provisional application No. 62/976,859, filed on Feb. 14, 2020.

(51) Int. Cl.
*F02C 7/28* (2006.01)
*F02C 7/12* (2006.01)

(52) U.S. Cl.
CPC .................. *F02C 7/28* (2013.01); *F02C 7/12* (2013.01); *F05D 2220/32* (2013.01); *F05D 2240/56* (2013.01); *F05D 2260/20* (2013.01)

(58) Field of Classification Search
CPC ...... F02C 9/18; F02C 6/08; F02C 7/18; F02C 7/28; F02C 7/12; F01D 9/023; F01D 9/02; F23R 3/60; F23R 2900/00018
See application file for complete search history.

(56) References Cited

U.S. PATENT DOCUMENTS

| | | | |
|---|---|---|---|
| 5,480,162 A * | 1/1996 | Beeman, Jr. | F01D 9/023 |
| | | | 277/355 |
| 5,848,874 A | 12/1998 | Heumann | |
| 6,533,284 B2 | 3/2003 | Aksit | |
| 6,751,962 B1 * | 6/2004 | Kuwabara | F01D 9/023 |
| | | | 60/800 |
| 8,317,464 B2 | 11/2012 | Alamsetty | |
| 8,707,711 B2 | 4/2014 | Tanimura | |
| 8,727,353 B2 | 5/2014 | Addis | |
| 2002/0105145 A1 | 8/2002 | Aksit | |
| 2004/0139746 A1 | 7/2004 | Soechting | |
| 2011/0072831 A1 | 3/2011 | Tanimura | |
| 2015/0118022 A1 | 4/2015 | Weber | |
| 2015/0330245 A1 | 11/2015 | Vo | |
| 2017/0292397 A1 | 10/2017 | Taniguchi | |

(Continued)

*Primary Examiner* — Todd E Manahan
*Assistant Examiner* — Rodolphe Andre Chabreyrie
(74) *Attorney, Agent, or Firm* — Getz Balich LLC

(57) ABSTRACT

A brush seal system includes a component including a first mating surface. The brush seal system further includes a brush seal including a brush seal backing plate, a retaining ring, and a plurality of bristles retained between the brush seal backing plate and the retaining ring. The brush seal backing plate includes a second mating surface mounted to the first mating surface. The brush seal system further includes at least one cooling channel extending from an exterior side of the component to an interior side of the component so as to bypass the brush seal.

20 Claims, 16 Drawing Sheets

(56) References Cited

U.S. PATENT DOCUMENTS

2018/0051582 A1  2/2018  Zheng
2019/0032786 A1  1/2019  Davis

* cited by examiner

COMBUSTOR TO VANE SEALING ASSEMBLY AND METHOD OF FORMING SAME

This application is a divisional of U.S. patent application Ser. No. 17/175,087 filed Feb. 12, 2021, which claims priority to U.S. Patent Appln. No. 62/976,859, filed Feb. 14, 2020, which are herein incorporated by reference in their entireties.

BACKGROUND

1. Technical Field

This disclosure relates generally to gas turbine engines, and more particularly to brush seal assemblies for gas turbine engines.

2. Background Information

High-energy gas flow generated in a combustion chamber of a gas turbine engine may be directed into a turbine section of the gas turbine engine to effect rotation of one or more turbines. Gas turbine engines may include sealing arrangements within or between the combustor and the turbine section. However, some sealing arrangements may not adequately make contact with components of the combustor or the turbine section throughout the range of operation of the gas turbine engine. As a result, some amount of uncontrolled leakage may occur past the sealing arrangements. Further, attempts to improve sealing configurations within the combustor or turbine section may result in formation of hot spots or bow wave distress due to the removal of some cooling previously provided by said leakage. Accordingly, what is needed is an improved sealing arrangement of a gas turbine engine which addresses one or more of the above-discussed concerns.

SUMMARY

It should be understood that any or all of the features or embodiments described herein can be used or combined in any combination with each and every other feature or embodiment described herein unless expressly noted otherwise.

According to an embodiment of the present disclosure, a gas turbine engine includes a turbine section including a first vane stage. The gas turbine engine further includes a combustor disposed forward of the first vane stage. The combustor includes a combustion chamber in fluid communication with the first vane stage. The combustion chamber is radially defined between a first shell and a second shell. The first shell includes a first seal assembly at an aft end of the first shell. The first seal assembly includes a brush seal forming a first seal between the first shell and a forward face of the first vane stage. The first seal assembly further includes at least one cooling channel extending from an exterior side of the first shell to an interior side of the first shell.

In the alternative or additionally thereto, in the foregoing embodiment, the second shell includes a second seal assembly at an aft end of the second shell. The second seal assembly includes a conformal seal forming a second seal between the second shell and the forward face of the first vane stage.

In the alternative or additionally thereto, in the foregoing embodiment, the brush seal includes a brush seal backing plate mounted to the first shell, a retaining ring, and a plurality of bristles retained between the brush seal backing plate and the retaining ring.

In the alternative or additionally thereto, in the foregoing embodiment, the first seal is a secondary seal and the first seal assembly further includes a hard seal. The hard seal forms a primary seal between the first shell and the forward face of the first vane stage.

In the alternative or additionally thereto, in the foregoing embodiment, the first shell includes a first mating surface on the exterior side and the brush seal backing plate includes a second mating surface mounted to the first shell along the first mating surface.

In the alternative or additionally thereto, in the foregoing embodiment, the at least one cooling channel includes a trench formed in the first mating surface of the first shell.

In the alternative or additionally thereto, in the foregoing embodiment, the at least one cooling channel includes at least one cooling aperture extending between the trench and the interior side of the first shell.

In the alternative or additionally thereto, in the foregoing embodiment, the at least one cooling aperture includes a plurality of axially spaced-apart cooling apertures.

In the alternative or additionally thereto, in the foregoing embodiment, the at least one cooling channel includes a groove formed in the second mating surface of the brush seal backing plate.

In the alternative or additionally thereto, in the foregoing embodiment, the at least one cooling channel further includes at least one cooling aperture extending through the first shell between the groove of the brush seal backing plate and the interior side of the first shell.

In the alternative or additionally thereto, in the foregoing embodiment, the first seal is a secondary seal. The first seal assembly further includes a hard seal including a radially extending face. The radially extending face forming a primary seal between the first shell and the forward face of the first vane stage. The at least one cooling channel includes a first passage formed in the second mating surface of the brush seal backing plate.

In the alternative or additionally thereto, in the foregoing embodiment, the at least one cooling channel further includes a second passage formed in the radially extending face of the hard seal and extending through the first shell between the first passage and the interior side of the first shell.

In the alternative or additionally thereto, in the foregoing embodiment, one or both of the first passage and the second passage has a scallop shape.

According to another embodiment of the present disclosure, a method for forming a seal between a combustor and a turbine section of a gas turbine engine includes providing the combustor comprising a combustion chamber radially defined between a first shell and a second shell. The method further includes forming a first seal between an aft end of the first shell and a forward face of a first vane stage of the turbine section with a first seal assembly including a brush seal. The method further includes directing cooling air with at least one cooling channel extending from an exterior side of the first shell to an interior side of the first shell.

In the alternative or additionally thereto, in the foregoing embodiment, the method further includes forming a second seal between an aft end of the second shell and the forward face of the first vane stage of the turbine section with a second seal assembly including a conformal seal.

In the alternative or additionally thereto, in the foregoing embodiment, the brush seal includes a brush seal backing plate mounted to the first shell, a retaining ring, and a plurality of bristles retained between the brush seal backing plate and the retaining ring.

In the alternative or additionally thereto, in the foregoing embodiment, the first seal is a secondary seal and the first seal assembly further includes a hard seal. The hard seal forms a primary seal between the first shell and the forward face of the first vane stage.

According to another embodiment of the present disclosure, a gas turbine engine includes a turbine section including a first vane stage. The gas turbine engine further includes a combustor disposed forward of the first vane stage. The combustor includes a combustion chamber in fluid communication with the first vane stage. The combustion chamber is defined between an inner shell and an outer shell. The inner shell includes an inner diameter seal assembly at an aft end of the inner shell. The inner diameter seal assembly includes a hard seal forming a first inner diameter seal between the inner shell and the forward face of the first vane stage. The inner diameter seal assembly further includes a brush seal, disposed radially inward of the hard seal, forming a second inner diameter seal between the inner shell and the forward face of the first vane stage. The inner diameter seal assembly further includes at least one cooling channel extending from an exterior side of the first shell to an interior side of the first shell.

In the alternative or additionally thereto, in the foregoing embodiment, the brush seal includes a brush seal backing plate mounted to the first shell, a retaining ring, and a plurality of bristles retained between the brush seal backing plate and the retaining ring.

In the alternative or additionally thereto, in the foregoing embodiment, the first shell includes a first mating surface on the exterior side and the brush seal backing plate includes a second mating surface mounted to the first shell along the first mating surface.

According to another embodiment of the present disclosure, a brush seal system includes a component including a first mating surface. The brush seal system further includes a brush seal including a brush seal backing plate, a retaining ring, and a plurality of bristles retained between the brush seal backing plate and the retaining ring. The brush seal backing plate includes a second mating surface mounted to the first mating surface. The brush seal system further includes at least one cooling channel extending from an exterior side of the component to an interior side of the component so as to bypass the brush seal.

In the alternative or additionally thereto, in the foregoing embodiment, the at least one cooling channel includes a trench formed in the first mating surface of the component.

In the alternative or additionally thereto, in the foregoing embodiment, the at least one cooling channel includes at least one cooling aperture extending through the component between the trench and the interior side of the component.

In the alternative or additionally thereto, in the foregoing embodiment, the at least one cooling aperture includes a plurality of axially spaced-apart cooling apertures.

In the alternative or additionally thereto, in the foregoing embodiment, the at least one cooling channel includes a groove formed in the second mating surface of the brush seal backing plate.

In the alternative or additionally thereto, in the foregoing embodiment, the at least one cooling channel further includes at least one cooling aperture extending through the component between the groove of the brush seal backing plate and the interior side of the component.

In the alternative or additionally thereto, in the foregoing embodiment, the component includes a hard seal adjacent the brush seal. The hard seal includes a sealing face. The at least one cooling channel includes a first panel formed in the second mating surface of the brush seal backing plate.

In the alternative or additionally thereto, in the foregoing embodiment, the at least one cooling channel further includes a second passage formed in the sealing face of the hard seal and extending through the component between the first passage and the interior side of the component.

In the alternative or additionally thereto, in the foregoing embodiment, one or both of the first passage and the second passage has a scallop shape.

The present disclosure, and all its aspects, embodiments and advantages associated therewith will become more readily apparent in view of the detailed description provided below, including the accompanying drawings.

DETAILED DESCRIPTION

Figure 1:
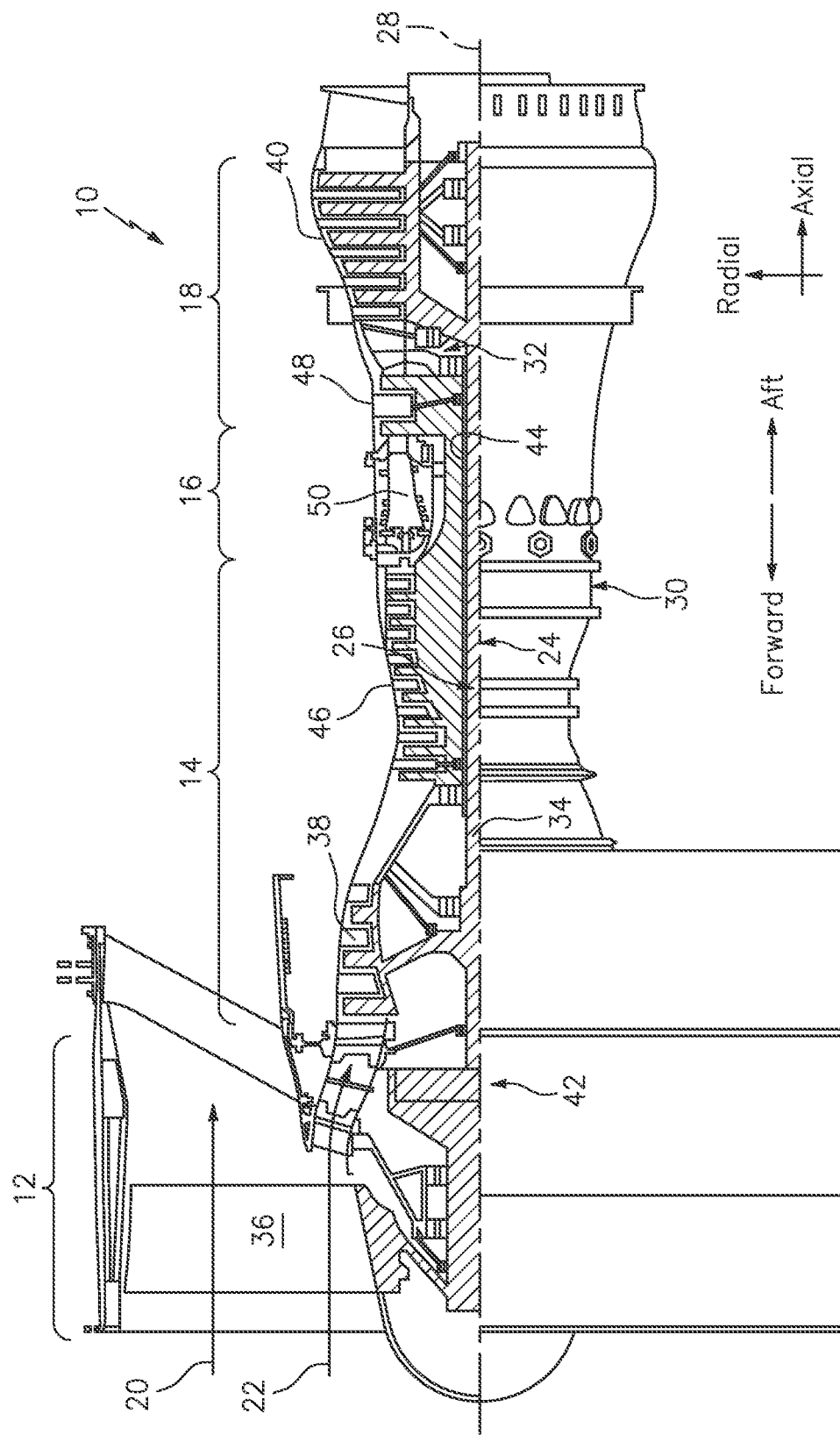
FIG. 1 illustrates a side cross-sectional view of a gas turbine engine, in accordance with one or more embodiments of the present disclosure.

It is noted that various connections are set forth between elements in the following description and in the drawings. It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities. It is further noted that various method or process steps for embodiments of the present disclosure are described in the following description and drawings. The description may present the method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

Referring to FIG. 1, an exemplary gas turbine engine 10 is schematically illustrated. The gas turbine engine 10 is disclosed herein as a two-spool turbofan engine that generally includes a fan section 12, a compressor section 14, a combustor section 16, and a turbine section 18. The fan section 12 drives air along a bypass flow path 20 while the compressor section 14 drives air along a core flow path 22 for compression and communication into the combustor section 16 and then expansion through the turbine section 18. Although depicted as a turbofan gas turbine engine in the disclosed non-limiting embodiments, it should be understood that the concepts described herein are not limited to use with turbofans as the teachings may be applied to other types of turbine engines including those with three-spool architectures.

The gas turbine engine 10 generally includes a low-pressure spool 24 and a high-pressure spool 26 mounted for rotation about a longitudinal centerline 28 of the gas turbine engine 10 relative to an engine static structure 30 via one or more bearing systems 32. It should be understood that various bearing systems 32 at various locations may alternatively or additionally be provided.

The low-pressure spool 24 generally includes a first shaft 34 that interconnects a fan 36, a low-pressure compressor 38, and a low-pressure turbine 40. The first shaft 34 is connected to the fan 36 through a gear assembly of a fan drive gear system 42 to drive the fan 36 at a lower speed than the low-pressure spool 24. The high-pressure spool 26 generally includes a second shaft 44 that interconnects a high-pressure compressor 46 and a high-pressure turbine 48. It is to be understood that "low pressure" and "high pressure" or variations thereof as used herein are relative terms indicating that the high pressure is greater than the low pressure. An annular combustor 50 is disposed between the high-pressure compressor 46 and the high-pressure turbine 48 along the longitudinal centerline 28. The first shaft 34 and the second shaft 44 are concentric and rotate via the one or more bearing systems 32 about the longitudinal centerline 28 which is collinear with respective longitudinal centerlines 28 of the first and second shafts 34, 44.

Airflow along the core flow path 22 is compressed by the low-pressure compressor 38, then the high-pressure compressor 46, mixed and burned with fuel in the combustor 50, and then expanded over the high-pressure turbine 48 and the low-pressure turbine 40. The low-pressure turbine 40 and the high-pressure turbine 48 rotationally drive the low-pressure spool 24 and the high-pressure spool 26, respectively, in response to the expansion.

Figure 2:
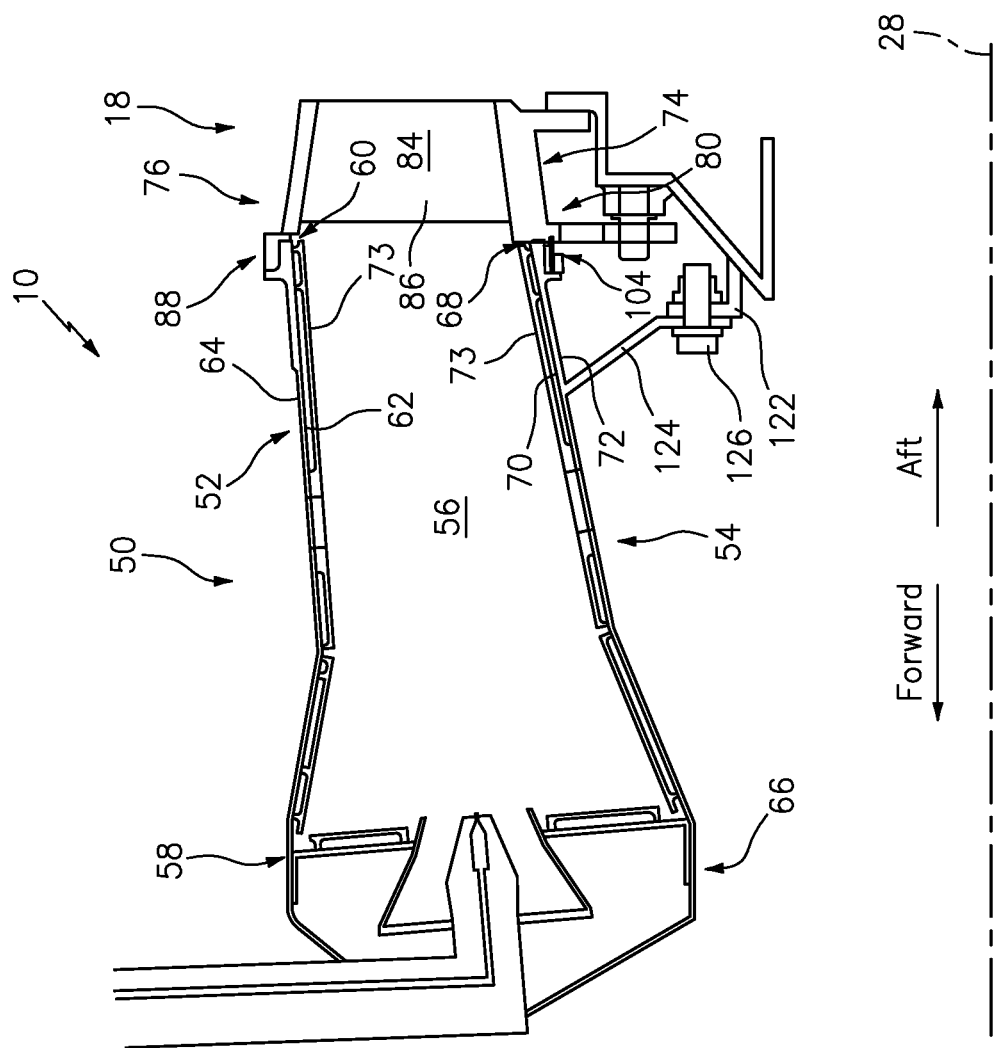
FIG. 2 illustrates a cross-sectional view of an exemplary combustor of a gas turbine engine, in accordance with one or more embodiments of the present disclosure.

Referring to FIG. 2, the combustor 50 includes an annular outer shell 52 and an annular inner shell 54 spaced radially inward of the outer shell 52, thus defining an annular combustion chamber 56 therebetween. The outer shell 52 includes an axially forward end 58 and an axially aft end 60 as well as a first surface 62 facing the combustion chamber 56 and a second surface 64 opposite the first surface 62. Similarly, the inner shell 54 includes an axially forward end 66 and an axially aft end 68 as well as a first surface 70 facing the combustion chamber 56 and a second surface 72 opposite the first surface 70. The combustor 50 may further include a plurality of liner panels 73 mounted to the respective first surfaces 62, 70 of one or both of the outer shell 52 and the inner shell 54. It should be understood that relative positional terms, such as "forward," "aft," "upper," "lower," "above," "below," and the like are relative to the normal operational attitude of the gas turbine engine 10 and should not be considered otherwise limiting.

Figure 3:
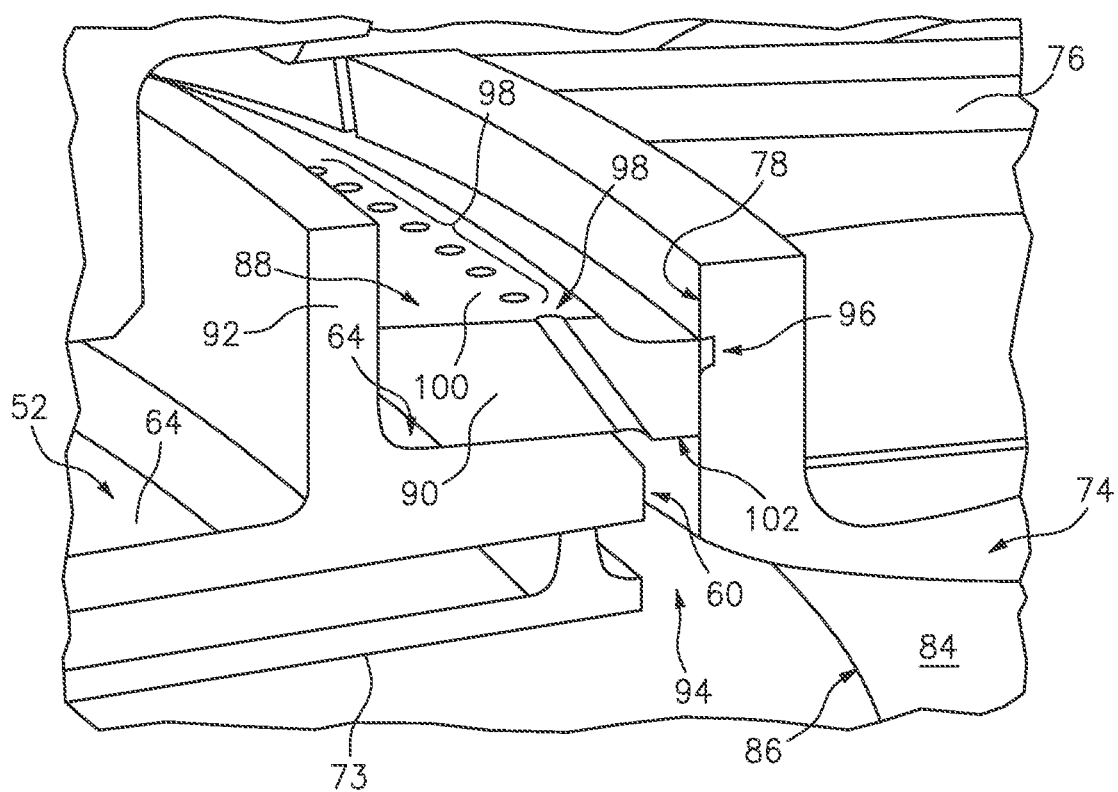
FIG. 3 illustrates a perspective cutaway view of an outer diameter seal assembly of the combustor of FIG. 2, in accordance with one or more embodiments of the present disclosure.
Figure 4:
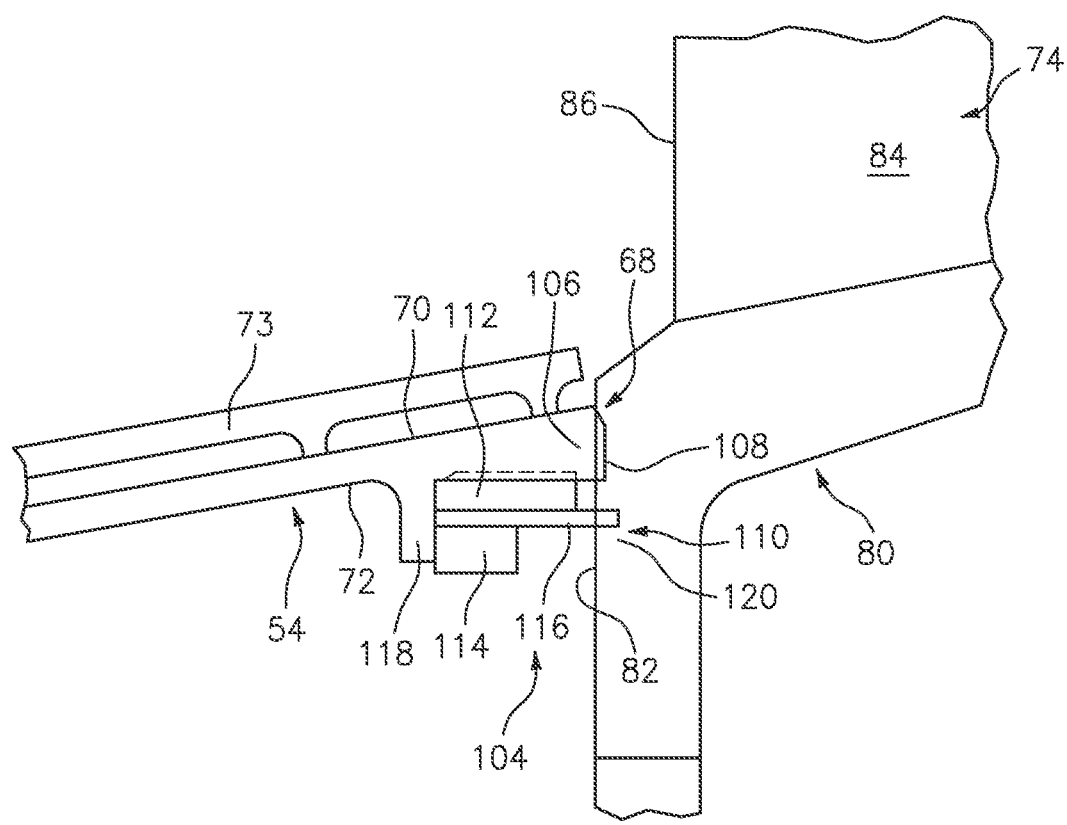
FIG. 4 illustrates a cross-sectional side view of an inner diameter seal assembly of the combustor of FIG. 2, in accordance with one or more embodiments of the present disclosure.

Referring to FIGS. 2-4, aspects of the present disclosure will be discussed with respect to a seal assembly for the combustor 50, however, it should be understood that the present disclosure is not limited to embodiments associated with combustor sealing arrangements. The turbine section 18 of the gas turbine engine 10 includes a first vane stage 74 which may be a forward-most vane stage of the turbine section 18. As shown in FIG. 2, the combustor 50 is axially forward of the first vane stage 74 and the combustion chamber 56 is in fluid communication with the first vane stage 74. The first vane stage 74 includes an upper platform 76 which defines an outer diameter forward face 78 of the first vane stage 74 which is adjacent the axially aft end 60 of the outer shell 52. The first vane stage 74 further includes a lower platform 80 which defines an inner diameter forward face 82 of the first vane stage 74 which is adjacent the axially aft end 68 of the inner shell 54.

The first vane stage 74 includes a plurality of vanes 84 that extend between the upper platform 76 and the lower platform 80. Each vane of the plurality of vanes 84 includes a leading edge 86 facing toward the combustion chamber 56. The leading edge 86 encounters the high-energy gas flow generated in the combustion chamber 56 and directs that gas flow further downstream in the turbine section 18.

The outer shell 52 may be in sealed communication with the first vane stage 74 via an outer diameter seal assembly 88 disposed at the axially aft end 60 of the outer shell 52. The outer diameter seal assembly 88 may include a seal 90 forming an outer diameter seal between the outer shell 52 and the outer diameter forward face 78 of the first vane stage 74. For example, in various embodiments, the seal 90 of the outer diameter seal assembly 88 may be configured as a conformal seal. However, it should be understood that the seal 90 may have any suitable seal configuration (e.g., a hard seal or a brush seal configuration) for forming the outer diameter seal between the outer shell 52 and the outer diameter forward face 78 of the first vane stage 74. The outer shell 52 may include a rib 92 which extends radially outward from the second surface 64 of the outer shell 52 and which is axially spaced from the axially aft end 60 of the outer shell 52. The seal 90 may be disposed between the rib 92 and the outer diameter forward face 78 of the first vane stage 74 on the second surface 64 of the outer shell 52. The seal 90 may extend axially aft from the rib 92 over a radially extending gap 94 between the outer shell 52 and the first vane stage 74.

The seal 90, if configured as a conformal seal, may include a wearing end portion 96 extending axially aft from the seal 90 and configured to wear down during initial operation of the gas turbine engine 10 to form the outer diameter seal with the outer diameter forward face 78 of the first vane stage 74. In various embodiments, the seal 90 may include a plurality of cooling holes 98 which extend between a radially outer surface 100 and a radially inner surface 102 of the seal 90. The plurality of cooling holes 98 may be in fluid communication with the radially extending gap 94 so as to provide cooling air to the radially extending gap 94.

The inner shell 54 is in sealed communication with the first vane stage 74 via an inner diameter seal assembly 104 disposed at the axially aft end 68 of the inner shell 54. In various embodiments, the inner diameter seal assembly 104 may include a hard seal 106 forming an inner diameter seal between the inner shell 54 and the inner diameter forward face 82 of the first vane stage 74. The hard seal 106 may be defined by a radially extending face 108 of the inner shell 54 at the axially aft end 68 which is in contact with the inner diameter forward face 82 of the first vane stage 74 forming the inner diameter seal between the inner shell 54 and the inner diameter forward face 82 of the first vane stage 74.

The inner diameter seal assembly 104 includes a brush seal 110 forming an inner diameter seal between the inner shell 54 and the inner diameter forward face 82 of the first vane stage 74. In various embodiments, the inner diameter seal assembly 104 may include both the hard seal 106 forming a first inner diameter seal (e.g., a primary seal) and the brush seal 110 forming a second inner diameter seal (e.g., a secondary seal). Alternatively, in various other embodiments, the inner diameter seal assembly 104 may include the brush seal 110 and may not include the hard seal 106. As shown in FIGS. 2 and 4, the brush seal 110 may be disposed radially inward of the hard seal 106, however, the brush seal 110 is not limited to such a location and may be, for example, disposed radially outward of the hard seal 106.

The brush seal 110 may include a brush seal backing plate 112 mounted to the inner shell 54, a retaining ring 114, and a plurality of bristles 116 radially retained between the brush seal backing plate 112 and the retaining ring 114. The inner shell 54 may include a rib 118 which extends radially inward from the second surface 72 of the inner shell 54 and which is axially spaced from the axially aft end 68 of the inner shell 54. The brush seal 110 may be disposed between the rib 118 and the inner diameter forward face 82 of the first vane stage 74 on the second surface 72 of the inner shell 54. The rib 118 may extend annularly about the inner shell 54 or may be composed of a plurality of circumferentially-segmented rib portions. The plurality of bristles 116 may extend axially between the inner shell 54 and the inner diameter forward face 82 of the first vane stage 74 so as to contact the inner diameter forward face 82 with a distal end 120 of the plurality of bristles 116. However, it should be understood that the plurality of bristles 116 may be oriented in any direction (e.g., radially, tangentially, etc.). The brush seal 110 may have improved contact with the inner diameter forward face 82 of the first vane stage 74, as compared to the hard seal 106 and, therefore, may provide greater sealing between the inner shell 54 and the first vane stage 74 relative to an inner diameter seal assembly including a hard seal alone.

In various embodiments, at least one liner panel of the plurality of liner panels 73, for example, an aft liner panel, may be mounted to the outer shell 52 radially inward (e.g., radially adjacent) of the outer diameter seal assembly 88. In various embodiments, at least one liner panel of the plurality of liner panels 73, for example, an aft liner panel, may be mounted to the inner shell 54 radially outward (e.g., radially adjacent) of the inner diameter seal assembly 104.

Referring to FIGS. 2 and 5-8, the inner diameter seal assembly 104 may include at least one cooling channel 128 extending from an exterior side 130 of the inner shell 54 to an interior side 132 of the inner shell 54 with respect to the combustion chamber 56. The at least one cooling channel 128 may be configured to direct cooling air 134 from the exterior side 130 of the inner shell 54 so as to bypass the brush seal 110 of the inner diameter seal assembly 104, thereby cooling components of the combustor 50 or turbine section 18 in the vicinity of the inner diameter seal assembly 104. Various cooling channel configurations are discussed herein, however, it should be understood that the present disclosure is not limited to any particular configuration of the cooling channel and that cooling channel configurations may be tailored to the particular application of the seal assembly. For example, the at least one cooling channel 128 may provide cooling air 134 to the inner shell 54, the first vane stage 74, and/or to aft liner panels of the plurality of liner panels 73 which are mounted to the inner shell 54 radially outward of the inner diameter seal assembly 104. Thus, the at least one cooling channel 128 may provide controlled cooling to components of the inner diameter seal assembly 104 which, without the inclusion of the brush seal 110 in the inner diameter seal assembly 104, may otherwise have experienced some minimal cooling effect as a result of unpredictable and intermittent leakage of air through the inner diameter seal assembly 104. Accordingly, cooling provided by the at least one cooling channel 128 may prevent or reduce the likelihood of bow wave distress and/or the formation of hot spots in components of the combustor 50 or turbine section 18 in the vicinity of the inner diameter seal assembly 104.

In various embodiments, the at least one cooling channel 128 may include a plurality of cooling channels 128 circumferentially spaced along the inner diameter seal assembly 104. In various embodiments, the at least one cooling channel 128 may be equally circumferentially spaced in order to provide uniform cooling. In various embodiments, the at least one cooling channel 128 may be circumferentially aligned with the plurality of vanes 84 in an intermittent fashion (e.g., the at least one cooling channel 128 may not be equally circumferentially spaced). In various embodiments, circumferential spacing of the at least one cooling channel 128 may be tailored to target hot spots, for example, in the combustor 50 or bow wake regions of a front portion of the plurality of vanes 84 to address bow wave distress concerns.

The inner shell 54 may include a first mating surface 136 on the exterior side 130. The first mating surface 136 may include a surface portion of the rib 118 of the inner shell 54. The brush seal backing plate 112 may include a second mating surface 138 mounted to the inner shell 54 along the first mating surface 136.

Figure 5A:
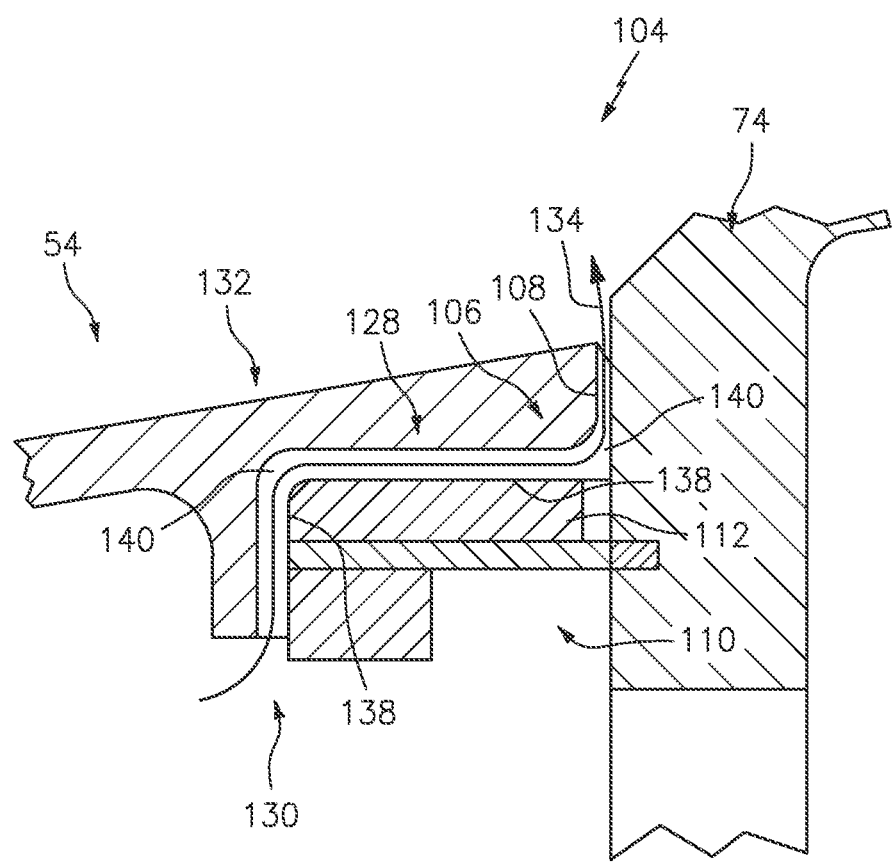
FIG. 5A illustrates a cut-away side view of an inner diameter seal assembly with an exemplary cooling channel, in accordance with one or more embodiments of the present disclosure.
Figure 5B:
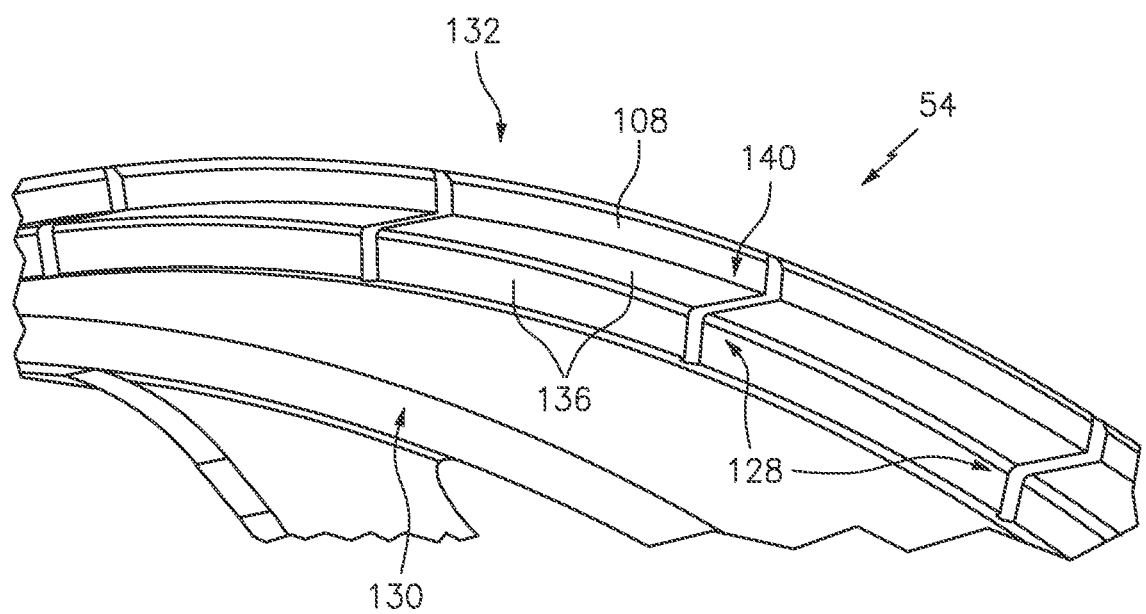
FIG. 5B illustrates a perspective view of a portion of the inner diameter seal assembly of FIG. 5A, in accordance with one or more embodiments of the present disclosure.

As shown in FIGS. 5A and 5B, in various embodiments, the at least one cooling channel 128 may include a trench 140 for the passage of cooling air 134 therethrough. The trench 140 may be formed in the first mating surface 136 of the inner shell 54. For example, the trench 140 may extend radially between the hard seal 106 and the brush seal 110. In various embodiments, the trench 140 may additionally or alternatively be formed in the second mating surface 138 of the brush seal backing plate 112. In various embodiments, the trench 140 may additionally be formed in the radially extending face 108 of the hard seal 106.

Figure 6:
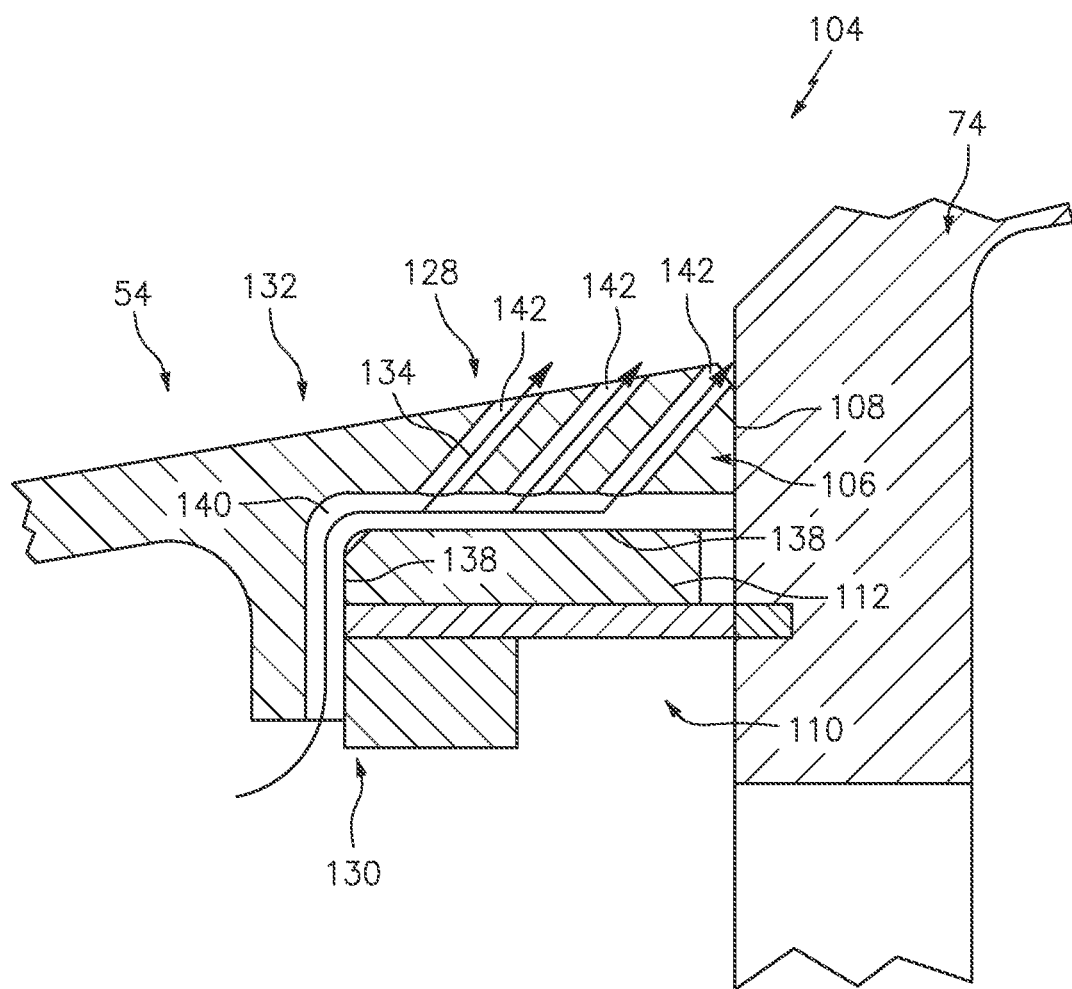
FIG. 6 illustrates a cut-away side view of an inner diameter seal assembly with an exemplary cooling channel, in accordance with one or more embodiments of the present disclosure.
Figure 7A:
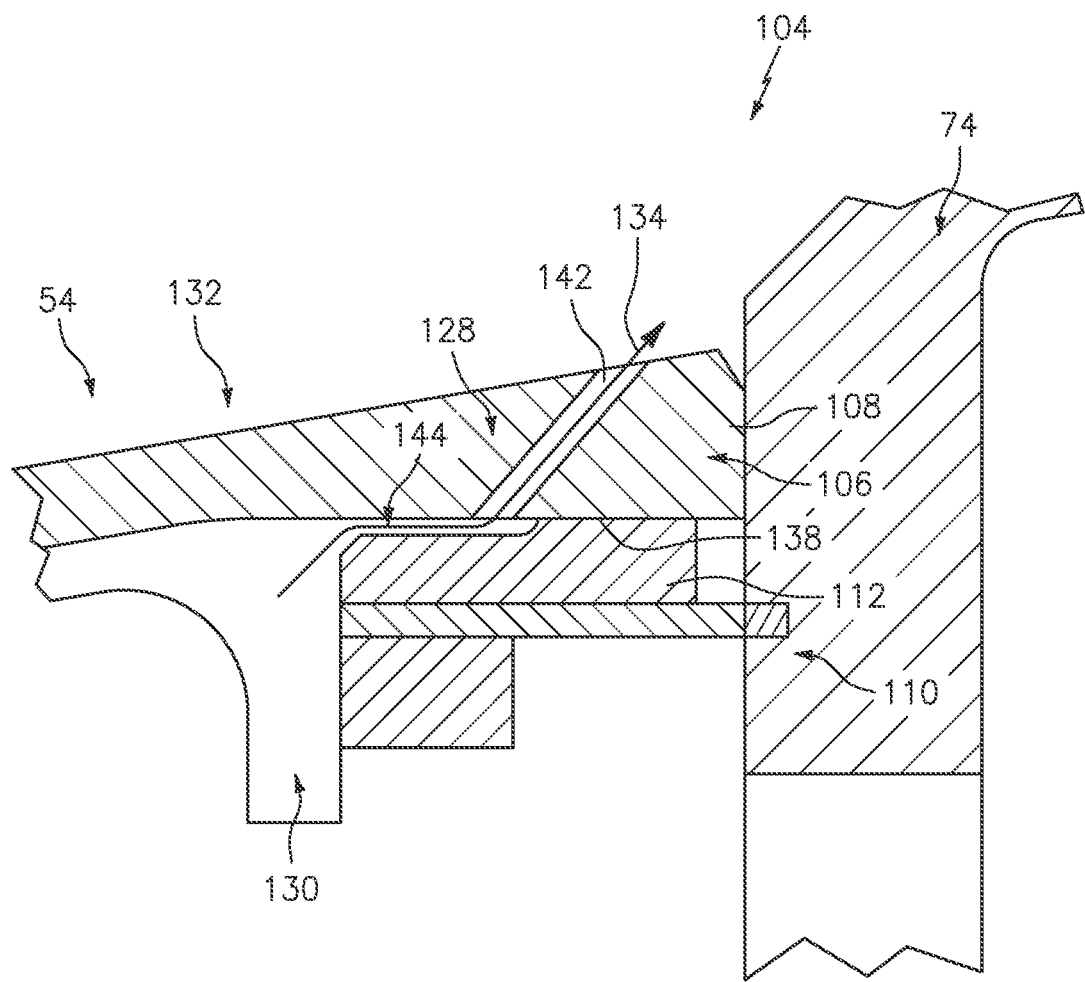
FIG. 7A illustrates a cut-away side view of an inner diameter seal assembly with an exemplary cooling channel, in accordance with one or more embodiments of the present disclosure.
Figure 7B:
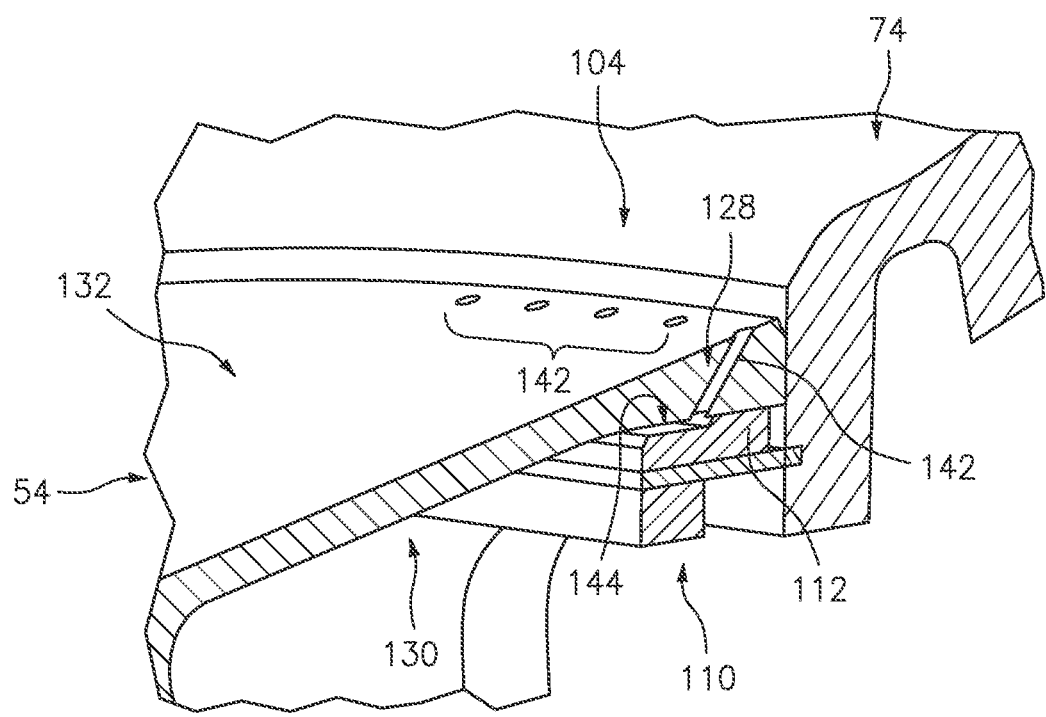
FIG. 7B illustrates a perspective view of a portion of the inner diameter seal assembly of FIG. 7A, in accordance with one or more embodiments of the present disclosure.
Figure 7C:
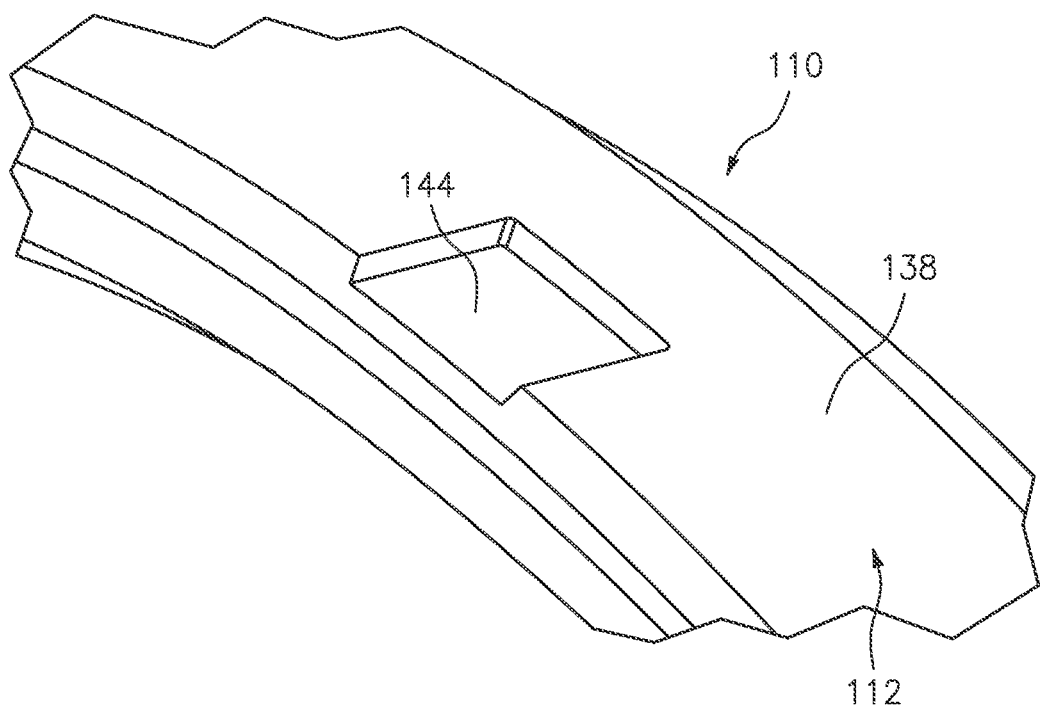
FIG. 7C illustrates a perspective view of a portion of the inner diameter seal assembly of FIG. 7A, in accordance with one or more embodiments of the present disclosure.
Figure 7D:
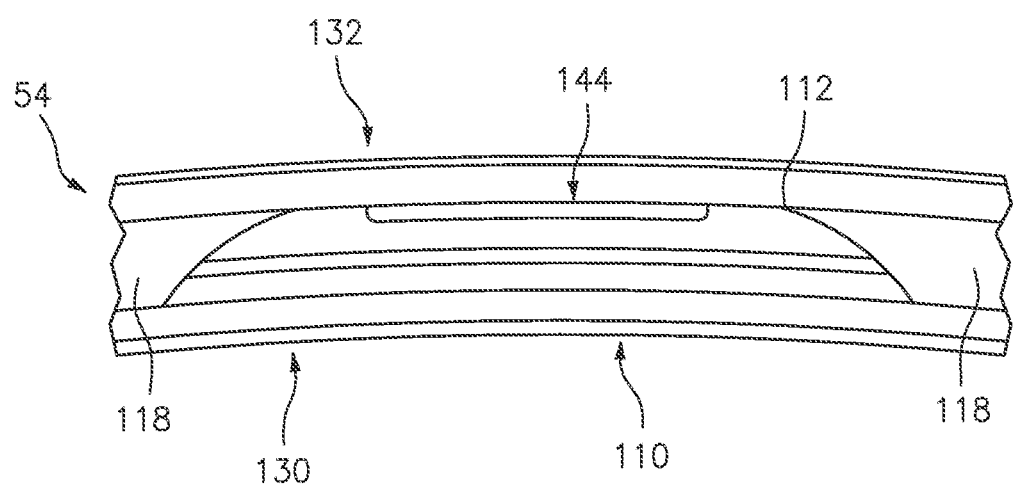
FIG. 7D illustrates a front view of a portion of the inner diameter seal assembly of FIG. 7A from a forward position, in accordance with one or more embodiments of the present disclosure.

As shown in FIG. 6, in various embodiments, the at least one cooling channel 128 may include at least one cooling aperture 142 extending between the trench 140 and the interior side 132 of the inner shell 54. In various embodiments, the at least one cooling aperture 142 may include a plurality of axially spaced-apart cooling apertures. In various embodiments, the at least one cooling aperture 142 may be directed towards the first vane stage 74. For example, the at least one cooling aperture 142 may be directed generally aftward in a direction from the exterior side 130 to the interior side 132 of the inner shell 54.

As shown in FIGS. 7A-D, in various embodiments, the at least one cooling channel 128 may include a groove 144 formed in the second mating surface 138 of the brush seal backing plate 112. The groove 144 may extend along a portion of an axial length of the second mating surface 138. In various embodiments, the groove 144 may additionally or alternatively be formed in the first mating surface 136 of the inner shell 54. The at least one cooling aperture 142 may extend between the groove 144 and the interior side 132 of the inner shell. In various embodiments, the at least one cooling aperture 142 may include a plurality of cooling apertures circumferentially (see, e.g., FIG. 7B) and/or axially (see, e.g., FIG. 6) spaced from one another. In various embodiments, the groove 144 may be circumferentially oriented between circumferentially-segmented portions of the rib 118.

Figure 8A:
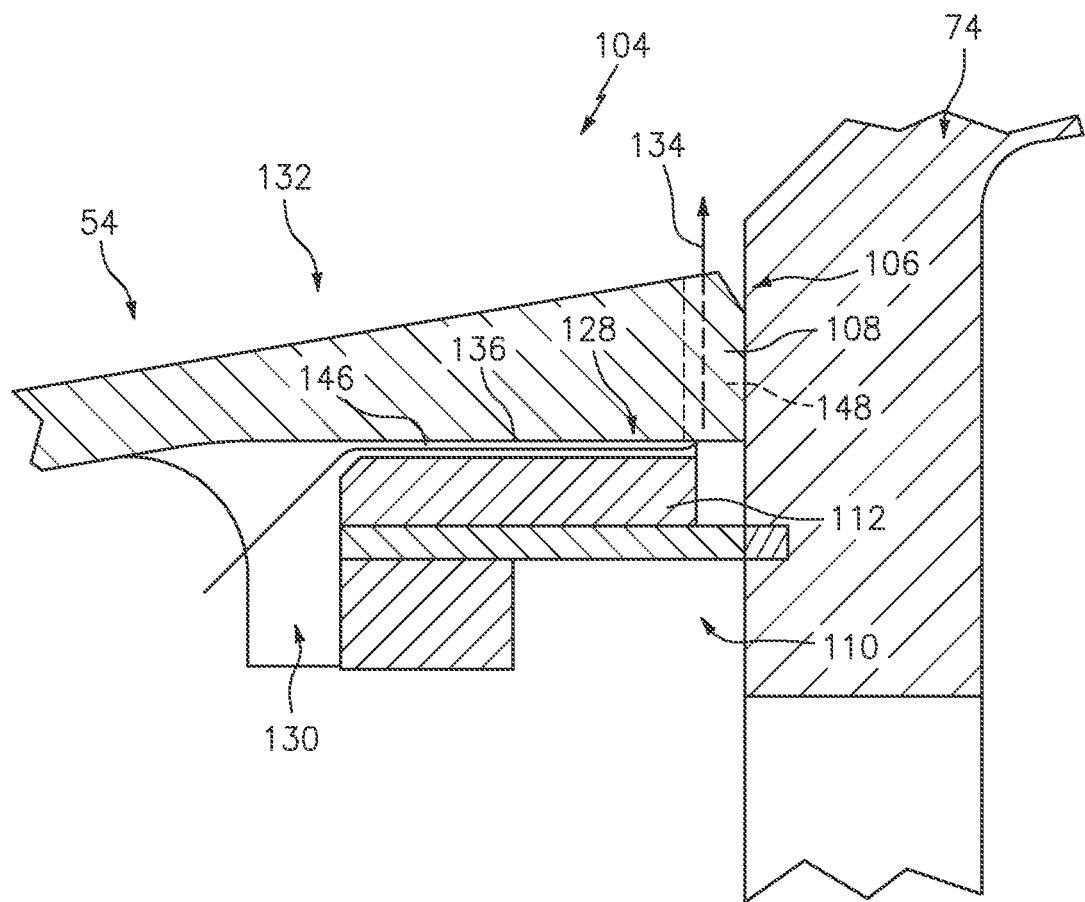
FIG. 8A illustrates a cut-away side view of an inner diameter seal assembly with an exemplary cooling channel, in accordance with one or more embodiments of the present disclosure.
Figure 8B:
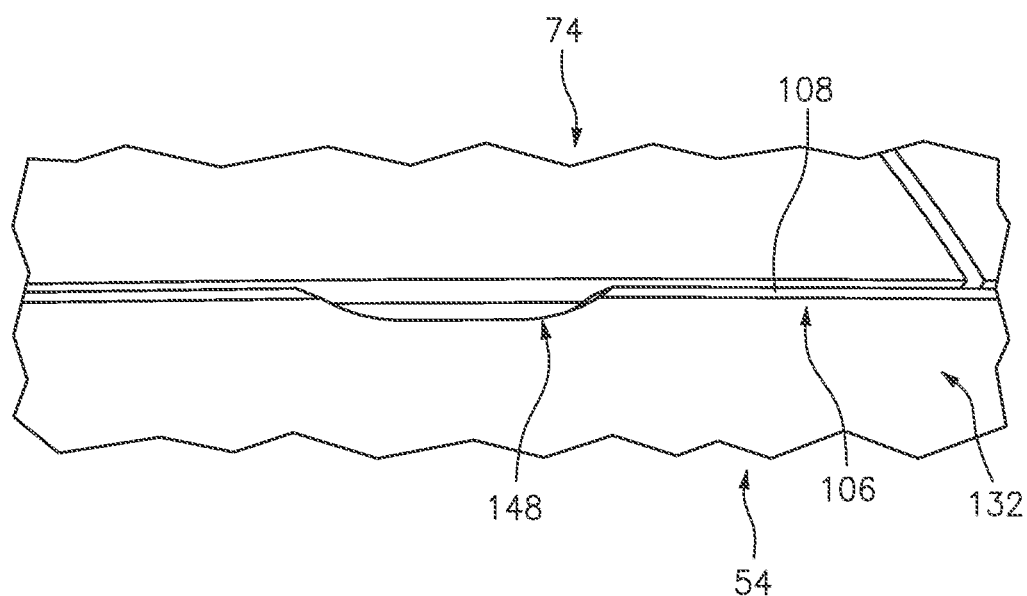
FIG. 8B illustrates a top view of the inner diameter seal assembly of FIG. 8A from a radially outer position, in accordance with one or more embodiments of the present disclosure.
Figure 8C:
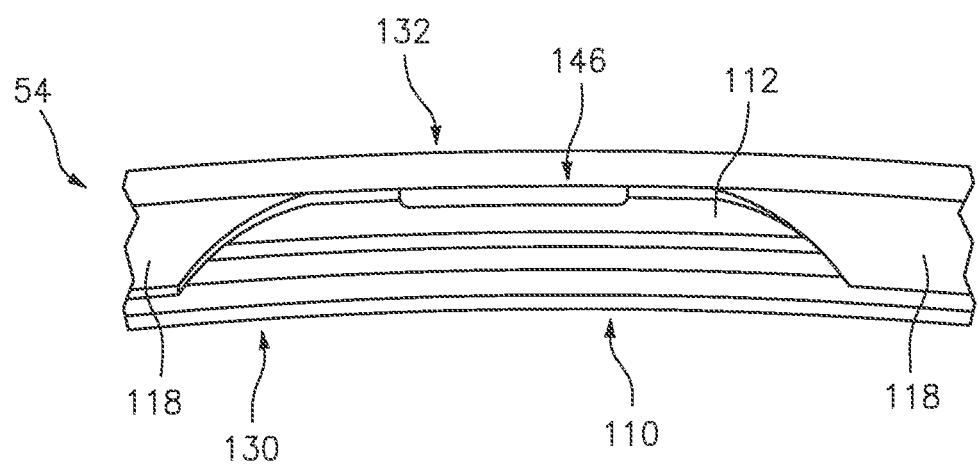
FIG. 8C illustrates a front view of a portion of the inner diameter seal assembly of FIG. 8A from a forward position, in accordance with one or more embodiments of the present disclosure.

As shown in FIGS. 8A-C, in various embodiments, the at least one cooling channel 128 may include a first passage 146 formed in the second mating surface 138 of the brush seal backing plate 112. The at least one cooling channel 128 may further include a second passage 148 formed in the radially extending face 108 of the hard seal 106 and extending through the inner shell 54 between the first passage 146 and the interior side 132 of the inner shell 54. Similar to the groove 144, in various embodiments, the first and second passages 146, 148 may be circumferentially oriented between circumferentially-segmented portions of the rib 118. In various embodiments, one or both of the first and second passages 146, 148 may have a scallop shape.

While the outer diameter seal assembly 88 is discussed above as including the seal and the inner diameter seal assembly 104 is discussed above as including one or both of the hard seal 106 and the brush seal 110, it should be understood that other configurations of the seals 106, 110 may be used. For example, in various embodiments, the outer diameter seal assembly 88 may include one or both of the hard seal 106 and the brush seal 110 while the inner diameter seal assembly 104 may include the seal 90. Additionally, for example, in various embodiments, each of the outer diameter seal assembly 88 and the inner diameter seal assembly 104 may include a brush seal such as the brush seal 110.

In various embodiments, the combustor 50 may include a single mounting point between the combustor 50 and a fixed casing structure 122 of the gas turbine engine 10. For example, the inner shell 54 may include an inner diameter leg 124 extending from the second surface 72 of the inner shell 54 and mounted to the fixed casing structure 122 via one or more fasteners 126. As a result of the single mounting point between the combustor 50 and the fixed casing structure 122, the combustor 50 may experience some rocking and twisting relative to the first vane stage 74 during operation of the gas turbine engine 10. Inclusion of the brush seal 110 in the inner diameter seal assembly 104 may accommodate the rocking and twisting while still provided adequate sealing between the inner shell 54 and the first vane stage 74.

Figure 9:
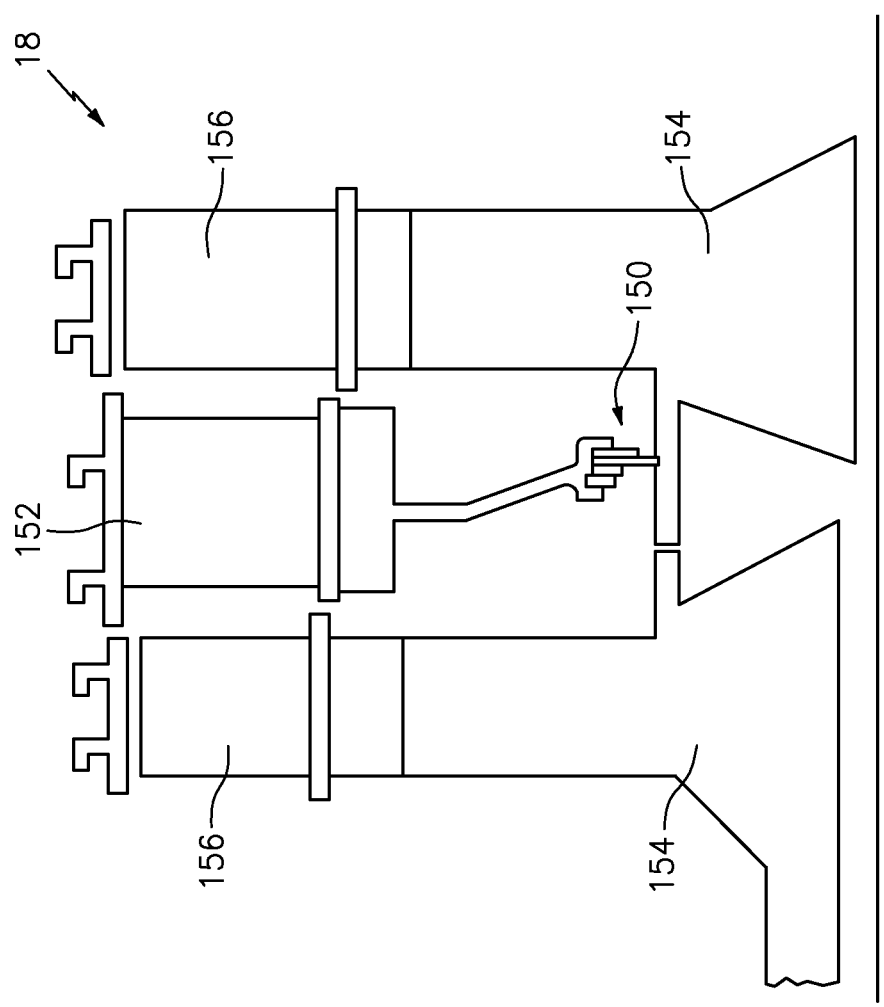
FIG. 9 illustrates a side, cross-sectional view of a portion of a turbine section for a gas turbine engine, in accordance with one or more embodiments of the present disclosure.
Figure 10:
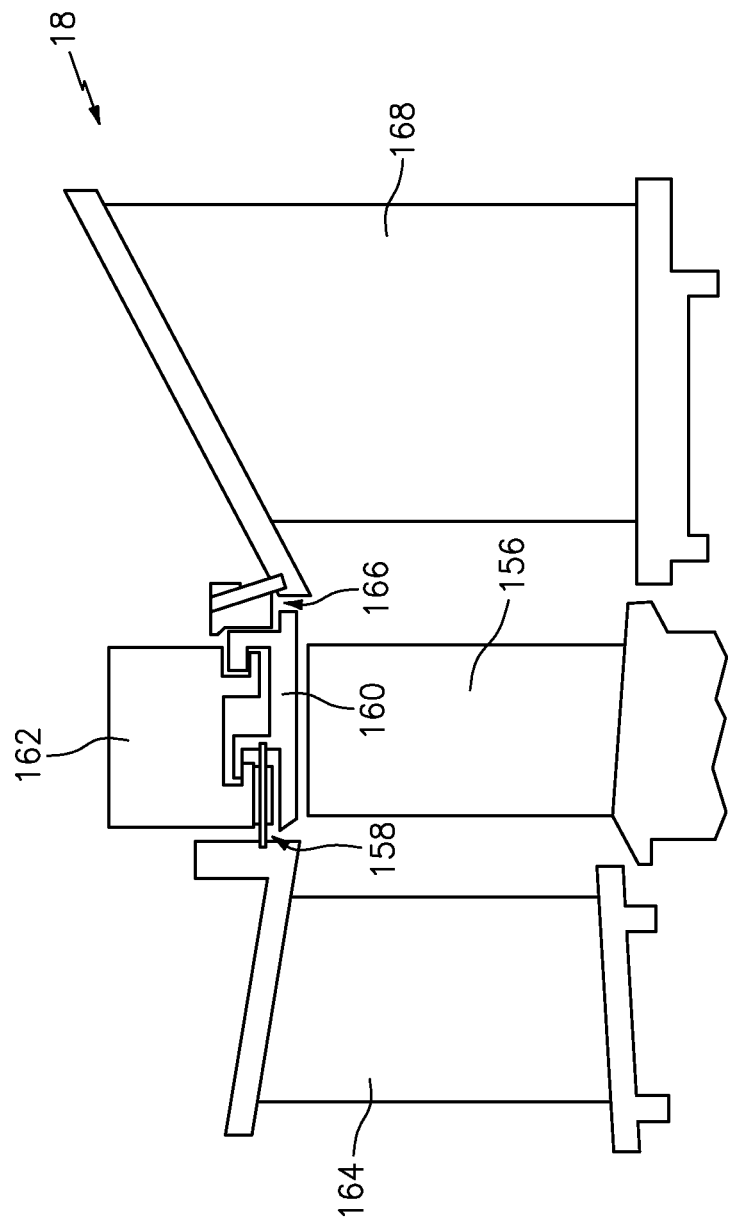
FIG. 10 illustrates a side, cross-sectional view of a portion of a turbine section for a gas turbine engine, in accordance with one or more embodiments of the present disclosure.

Referring now to FIGS. 9 and 10, while aspects of the present disclosure are explained above with respect to the seal assemblies 88, 104 between the shells 52, 54 and the first vane stage 74, it should be understood that aspects of the present disclosure are applicable to seal assemblies in other applications as well, such as between static and/or rotating components, where it may be desirable to allow some amount of controlled leakage to bypass a brush seal assembly (e.g., as cooling air). For example, aspects of the present disclosure may be applicable to brush seal assemblies and associated cooling channels for use in the turbine section 18 of the gas turbine engine 10. As shown in FIG. 9, for example, the turbine section 18 may include a seal assembly 150 configured to provide sealing between a fixed vane 152 and a rotating disk 154 having a plurality of rotor blades 156. The seal assembly 150 may have a configuration which is similar to the inner diameter seal assembly 104 including a brush seal extending in a substantially radial direction to contact a rotating surface of the rotating disk 154. As shown in FIG. 10, for example, the turbine section 18 may include a blade outer air seal (BOAS) 160 having one or more seal assemblies 158, 166, including a brush seal, for providing sealing between the BOAS 160 and adjacent vanes 164, 168. As previously discussed with respect to the inner diameter seal assembly 104, the seal assemblies 150, 158, 166 may include one or more cooling channels configured to provide a controlled leakage of fluid (e.g., cooling air) through the respective seal assembly 150, 158, 166.

While various aspects of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these particular features may be described individually, it is within the scope of the present disclosure that some or all of these features may be combined with any one of the aspects and remain within the scope of the present disclosure. References to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Accordingly, the present disclosure is not to be restricted except in light of the attached claims and their equivalents.

What is claimed is:

1. A brush seal system comprising:
   a component comprising an exterior side and an interior side, the component further comprising a first mating surface on the exterior side;
   a brush seal comprising a brush seal backing plate, a retaining ring, and a plurality of bristles retained between the brush seal backing plate and the retaining ring, the brush seal backing plate comprising a second mating surface mounted to the component along the first mating surface; and
   at least one cooling channel extending from the exterior side of the component to the interior side of the component so as to bypass the brush seal, the at least one cooling channel comprising a groove formed in the second mating surface of the brush seal backing plate.

2. The brush seal system of claim 1, wherein the at least one cooling channel further comprises at least one cooling aperture extending through the component between the groove of the brush seal backing plate and the interior side of the component.

3. The brush seal system of claim 1, wherein the groove is additionally formed in the first mating surface.

4. The brush seal system of claim 1, wherein the at least one cooling channel comprises at least one cooling aperture extending through the component between the groove and the interior side of the component.

5. The brush seal system of claim 4, wherein the at least one cooling aperture comprises a plurality of axially spaced-apart cooling apertures.

6. The brush seal system of claim 4, wherein the at least one cooling aperture comprises a plurality of circumferentially spaced-apart cooling apertures.

7. The brush seal system of claim 1, wherein the component comprises a hard seal adjacent the brush seal, the hard seal comprising a sealing face.

8. A gas turbine engine comprising:
   a turbine section comprising a first vane stage having a forward face; and
   a combustor disposed forward of the first vane stage, the combustor comprising a combustion chamber in fluid communication with the first vane stage, the combustion chamber radially defined between a first shell and a second shell, the first shell comprising a first seal assembly at an aft end of the first shell, the first shell comprising an exterior side and an interior side, the first shell further comprising a first mating surface on the exterior side, the first seal assembly comprising:
   a brush seal forming a first seal between the first shell and the forward face, the brush seal comprising a brush seal backing plate mounted to the first shell, a retaining ring, and a plurality of bristles retained between the brush seal backing plate and the retaining ring, the brush seal backing plate comprising a second mating surface mounted to the first shell along the first mating surface; and
   at least one cooling channel extending from the exterior side of the component to the interior side of the component, the at least one cooling channel comprising a groove formed in the second mating surface of the brush seal backing plate.

9. The gas turbine engine of claim 8, wherein the second shell comprises a second seal assembly at an aft end of the second shell, the second seal assembly comprising a conformal seal forming a second seal between the second shell and the forward face of the first vane stage.

10. The gas turbine engine of claim 8, wherein the first seal is a secondary seal and wherein the first seal assembly further comprises a hard seal, the hard seal forming a primary seal between the first shell and the forward face of the first vane stage.

11. The gas turbine engine of claim 10, wherein the hard seal comprises a radially extending face, the radially extending face forming the primary seal between the first shell and the forward face of the first vane stage.

12. The gas turbine engine of claim 8, wherein the at least one cooling channel further comprises at least one cooling aperture extending through the first shell between the groove of the brush seal backing plate and the interior side of the first shell.

13. The gas turbine engine of claim 8, wherein the groove is additionally formed in the first mating surface.

14. The gas turbine engine of claim 8, wherein the at least one cooling channel comprises at least one cooling aperture extending through the first shell between the groove and the interior side of the first shell.

15. The gas turbine engine of claim 14, wherein the at least one cooling aperture comprises a plurality of axially spaced-apart cooling apertures.

16. The gas turbine engine of claim 14, wherein the at least one cooling aperture comprises a plurality of circumferentially spaced-apart cooling apertures.

17. The gas turbine engine of claim 8, wherein the first shell includes rib extending from the exterior side, the rib comprising a plurality of circumferentially-segmented rib portions, the brush seal disposed between the rib and the forward face.

18. The gas turbine engine of claim 17, wherein the groove is circumferentially oriented adjacent rib portions of the plurality of circumferentially-segmented rib portions.

19. A method for forming a seal between a combustor and a turbine section of a gas turbine engine, the method comprising:
   providing the combustor comprising a combustion chamber radially defined between a first shell and a second shell, the first shell comprising an exterior side and an interior side, the first shell further comprising a first mating surface on the exterior side;
   forming a first seal between an aft end of the first shell and a forward face of a first vane stage of the turbine section with a first seal assembly comprising a brush seal, the brush seal comprising a brush seal backing plate mounted to the first shell, a retaining ring, and a plurality of bristles retained between the brush seal backing plate and the retaining ring; and
   directing cooling air with at least one cooling channel extending from the exterior side of the first shell to the interior side of the first shell, the at least one cooling channel comprising a groove formed in the second mating surface of the brush seal backing plate.

20. The method of claim 19, wherein the at least one cooling channel comprises at least one cooling aperture extending through the first shell between the groove of the brush seal backing plate and the interior side of the first shell.

* * * * *